United States Patent

Spiess

[11] Patent Number: 6,065,950
[45] Date of Patent: May 23, 2000

[54] SYSTEM FOR MANUFACTURING MOLDED ARTICLES AND ENGINEERING MOLD CAVITIES

[76] Inventor: Armin Spiess, Zürcher Strasse 254, CH-9014 St. Gallen, Switzerland

[21] Appl. No.: 09/109,321

[22] Filed: Jul. 2, 1998

Related U.S. Application Data

[63] Continuation-in-part of application No. 08/647,974, filed as application No. PCT/EP94/03966, Nov. 30, 1994, abandoned.

[30] Foreign Application Priority Data

Nov. 30, 1993 [DE] Germany ............................ 43 40 661

[51] Int. Cl.$^7$ ............................ B29C 45/40; B29C 45/14
[52] U.S. Cl. ........................ 425/11; 425/186; 425/190; 425/192 R; 425/556; 249/68; 249/102
[58] Field of Search ................................ 425/182, 185, 425/186, 190, 192 R, 556, 11, 589; 249/67, 68, 102

[56] References Cited

U.S. PATENT DOCUMENTS

| 3,103,705 | 9/1963 | Letica . | |
|---|---|---|---|
| 4,861,254 | 8/1989 | Takeuchi et al. | 425/190 |
| 5,308,234 | 5/1994 | Nicke et al. | 425/188 |
| 5,738,883 | 4/1998 | Tanaka | 425/190 |

FOREIGN PATENT DOCUMENTS

| 0 278 203 | 9/1963 | European Pat. Off. . |
|---|---|---|
| 3 151 859 | 7/1982 | Germany . |
| 58-58729 | 2/1983 | Japan . |
| 2020314 | 1/1990 | Japan . |
| 2 189 182 | 10/1987 | United Kingdom . |

*Primary Examiner*—David A. Simmons
*Assistant Examiner*—Robert A. Hopkins
*Attorney, Agent, or Firm*—Collard & Roe, PC

[57] ABSTRACT

A system for manufacturing molded articles and simultaneous engineering of mold cavities, comprising a casting device, a machining device and interchangeable cassettes. The casting device comprises a casting mold having two mold halves, each having cassette receptacles and being moveable against each other perpendicular to a separation surface of the casting mold. The casting device also has interchangeable cassettes inserted into the cassette receptacles of the mold halves so that they abut each other and enclose the mold cavity when the casting mold is closed. The cassettes have positive guides on their sides opposite the separation surface that are insertable into the positive guides on the cassette receptacles of the mold halves. The machining device comprises a machining station such as a drill, a turning tool, a milling tool, a grinder and an eroding tool, and also a clamping device within a working range of the machining station. The clamping device has cassette receptacles with positive guides that correspond to the positive guides of the cassettes. The cassettes can be interchangeably and precisely mounted in the cassette receptacles of the machining device and of the casting device without adjusting the position of the cassettes.

6 Claims, 8 Drawing Sheets

6,065,950

SYSTEM FOR MANUFACTURING MOLDED ARTICLES AND ENGINEERING MOLD CAVITIES

This application is a continuation-in-part of U.S. Pat. application Ser. No. 08/647,974, filed on May 29, 1996, abandoned, filed as PCT/EP94/03966 on Nov. 30, 1994.

BACKGROUND OF THE INVENTION

1. Field of the Invention

This invention relates to a system for manufacturing molded articles and for simultaneously engineering mold cavities. In particular this invention relates to a system comprising a casting device having interchangeable cassettes defining the mold cavities, and a machinery device for machining the mold cavities.

2. The Prior Art

According to the state of the art, the mold cavities of casting molds for injection or pressure molding are usually manufactured in machining stations that are located in the mold department of the foundry, or with a company specialized in mold construction. The machining stations are equipped with suitable drilling, turning milling, grinding and eroding tool systems, with which the mold cavities are manufactured and the surfaces of the mold cavities are machined. For clamping the casting molds in the machining stations of the mold construction facility, the machining stations are equipped with known clamping means. The cassettes must be clamped by the clamping means into each of the positions required for machining. To obtain correct and dimensionally accurate clamping, it is helpful if the mold cavities are present in uniformly designed cassettes. However, even if the cassettes are clamped in the correct position, the trade skill of the mold maker is nevertheless required to a high degree.

Such adaptation work is particularly time-consuming, with complicated cast pieces where the mold cavity has to be reworked several times after trial castings. If the cassettes are incorrectly clamped in the machining station, this may result in flawed machining that cannot be repaired.

SUMMARY OF THE INVENTION

It is therefore an object of the invention to provide a system for manufacturing molded articles and simultaneously engineering the respective mold cavities to simplify the work processes in the manufacturing and re-working of the mold cavities and during assembly and use of the casting molds.

This and other objects are solved according to the invention by a system comprising a casting device and a machining device wherein cassettes can be interchangeably and precisely mounted in cassette receptacles of the machining device and the casting device without adjusting the position of the cassettes. The casting device comprises a casting mold having two halves moveable against each other perpendicular to the separation surface of the casting mold, and interchangeable cassettes inserted into cassette receptacles of the mold halves. The cassettes abut each other and enclose the mold cavity when the casting mold is closed. There are also positive guides provided on the mold surface opposite the separation surface that are insertable into corresponding positive guides in the cassette receptacles of the mold halves.

The machining device can be any type of machining device, such as a drill, a turning tool, a milling tool, a grinder, or an eroding tool. The machining device has a clamping device located within a working range of the machining station. The clamping device has cassette receptacles with positive guides that correspond to the positive guides on the cassettes.

With the system according to the invention, the interchangeable cassettes containing the individually designed mold cavities have positive guides on their sides remote from the separation surfaces. These guides have dimensions conforming to the cassette receptacles on the casting device and in the machining station. It is therefore possible to slide the cassettes very rapidly without any adjusting or installation and adaption expenditure either into the cassette receptacle of the casting device, or into the corresponding cassette receptacle in the machining station. This significantly reduces the work during manufacture and the reworking of the mold cavities.

A special problem in connection with casting devices having interchangeable cassettes is trying to be able to install and remove the cassettes rapidly and simply without interference by the ejector package, the drive of the ejector package or by other parts installed crosswise relative to the push-in and push-out directions of the cassettes.

According to the invention, the mold half provided with the ejector package has a receiving space for the ejector package that is held, guided and supported on guide columns which are mounted on the associated cassette and extend through the receiving space. The ejector package is thus exclusively held, guided and supported on the associated cassette, so that it can be installed and removed together with the cassette. Due to the narrow and exact guidance of the ejector package on the cassette by the guide columns, both the ejector package and the cassette are supported in a floating manner with respect to the mold halves without resulting in wedging between the ejectors and the cassette.

With the combination of the cassette and ejector package, it is possible to machine the faces of the ejectors together with the mold cavity in the machining station so that the face of the ejectors automatically follow the other contour of the surface delimiting the mold.

Preferably, the ejector package is associated with a claw plate that is actuated by a tension and pressure bar and which engages the ejector package from behind with the ejector package being pushed in behind the claws parallel with the cassette. The claw plate makes it possible to exert the required forces on the ejector package to pull the ejector package back without impairing the capability of the ejector package of being pushed in together with the cassette.

When the mold is closed, the claw plate is preferably sunk flush in a matching recess of the associated clamping plate. A claw plate that can be sunk in this way makes it possible to support the very high forces on the shield of the machine that act on the cassette during the casting process. This prevents impermissible flexing of the cassette.

In order to have sufficient space for arranging the guide columns for the ejector package in spite of the claw plate, the claw plate has recesses on its edge within the range of the guide columns.

Preferably, the cassettes are fixable in the cassette receptacle of the machining station by adaptors. This way, it is possible to carry out the required machining work in different predetermined directions if necessary, such as horizontally, vertically or slanted.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
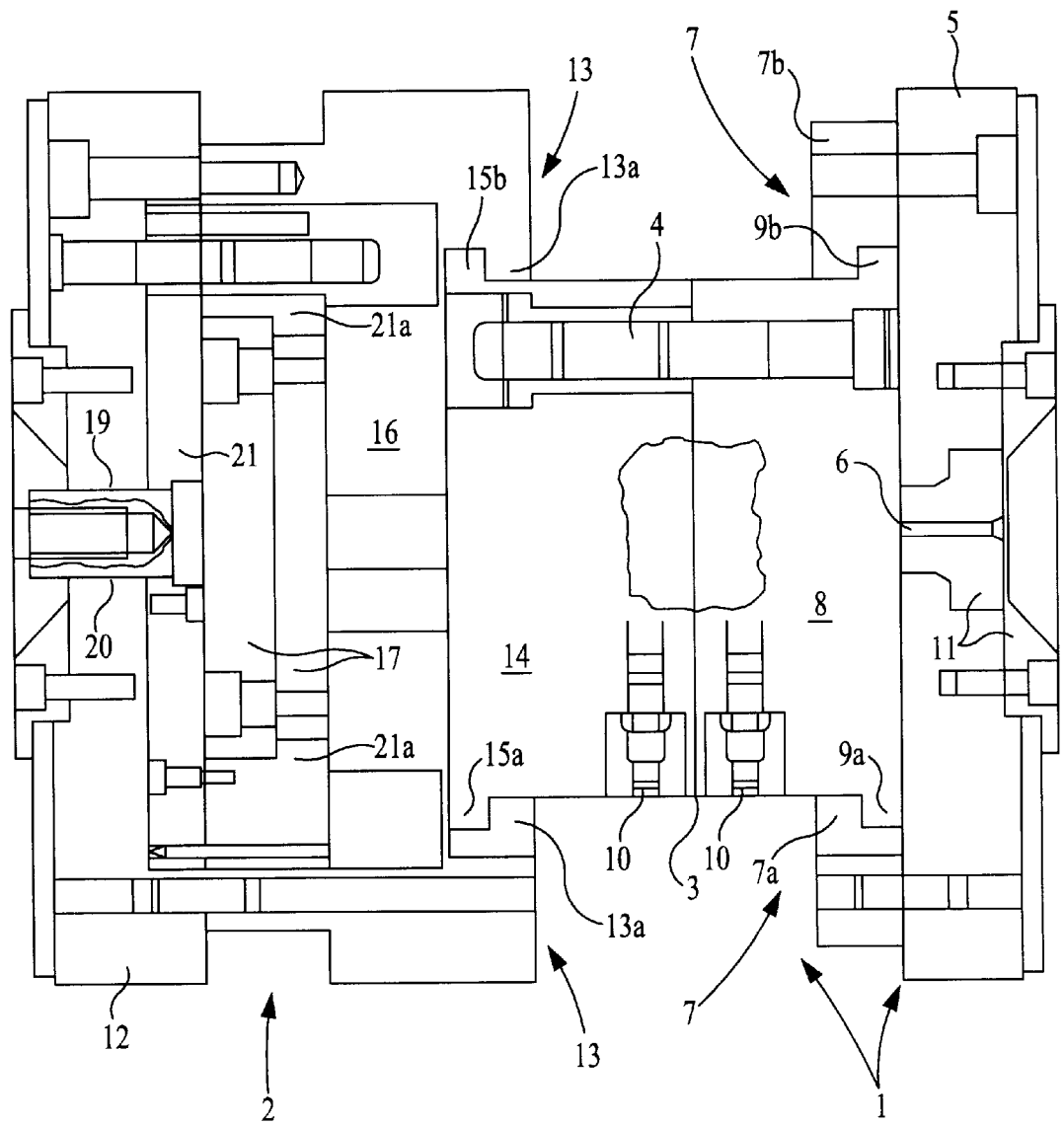
FIG. 1 shows a partial sectional view from the top of the casting device.

Referring now in detail to the drawings and, in particular, FIG. 1, there is shown two halves 1, 2 of the mold in their totality. Mold halves 1 and 2 can be separated from each other within the zone of separation surface 3 and are guided on each other perpendicular to separation surface 3 by guides.

Figure 3:
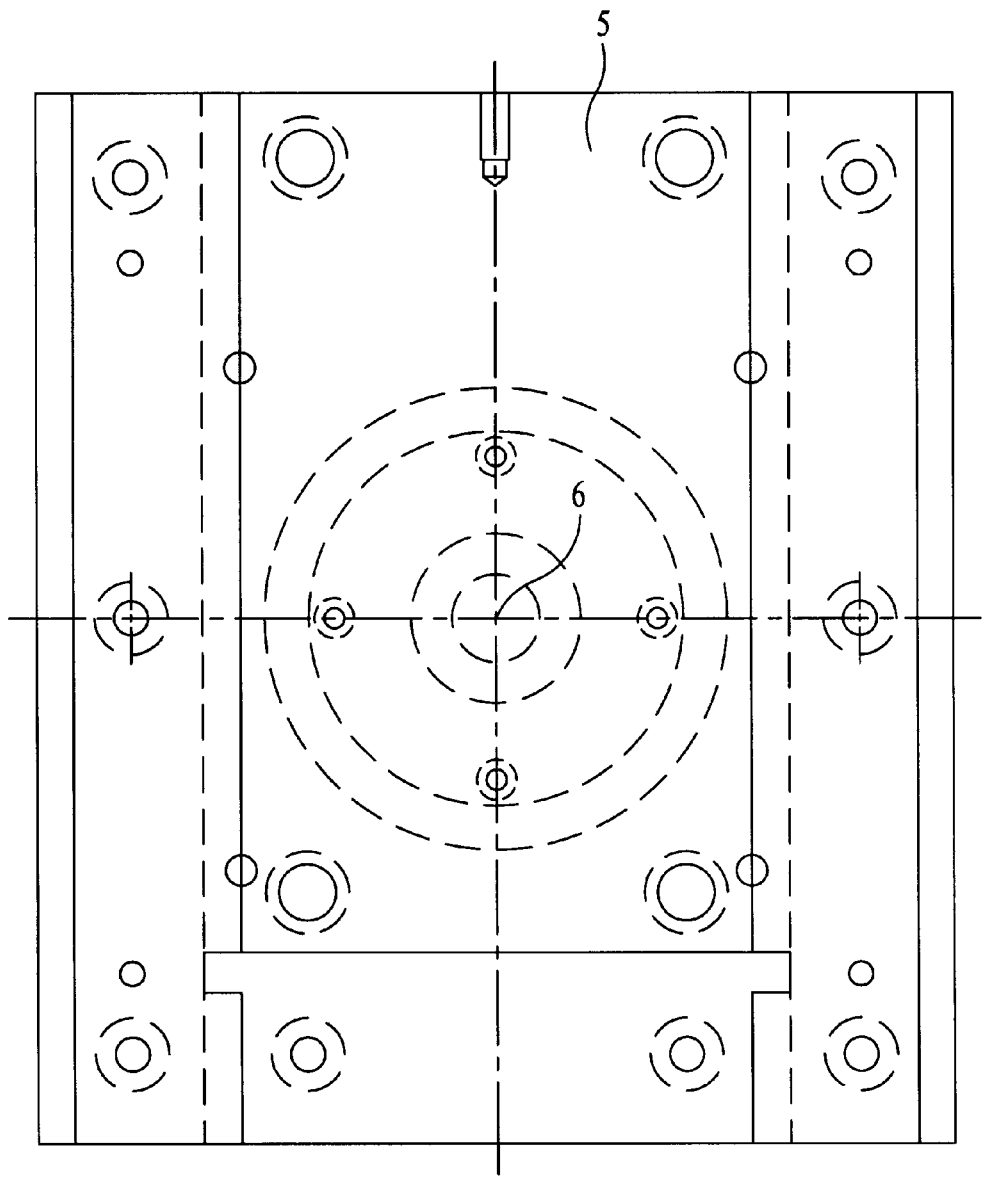
FIG. 3 shows a lateral view of the casting device viewed in the direction of casting.

Mold half 1 has a clamping plate 5 with a filling opening 6 of the casting mold present in the center of plate 4, as shown in FIG. 3. On its left side in FIG. 1, clamping plate 5 has positive guides 7a and 7b, which has an L-shaped cross section and forms a cassette receptacle 7. A cassette 8 is inserted in receptacle 7 and has a T-guide 9a, 9b on its side remote from separation surface 3. T-guide 9a, 9b is adapted to positive guides 7a, 7b of cassette receptacle 7 and grips receptacle 7 from behind.

On its side remote from separation surface 3, cassette 8 is supported on clamping plate 5 over a large area and is laterally provided with cooling ducts. Filling opening 6 is surrounded in clamping plate 5 by a heated nozzle body 11. Filling opening 6 of the casting mold and associated cassette have a nozzle (not shown) that is divided in the plane of support between the nozzle and the clamping plate. When the mold is closed, the parts of the nozzle abut one another in a sealing way in the separation surface. When the mold is open, cassette 8 can be pulled out of cassette receptacle 7 without being obstructed by the nozzle.

Mold half 2 has a clamping plate 12 which has positive guide rails 13a and 13b having an L-shaped cross section mounted on the right side of plate 12. Rails 13a and 13b jointly form a cassette receptacle 13. Cassette receptacle 13 has a T-guide 15a, 15b on its side remote from separation surface 3, with the dimensions of this guide being adapted to positive guide rails 13a and 13b of t cassette receptacle 13, with the T-guide 15a, 15b gripping receptacle 13 from behind.

Figure 2:
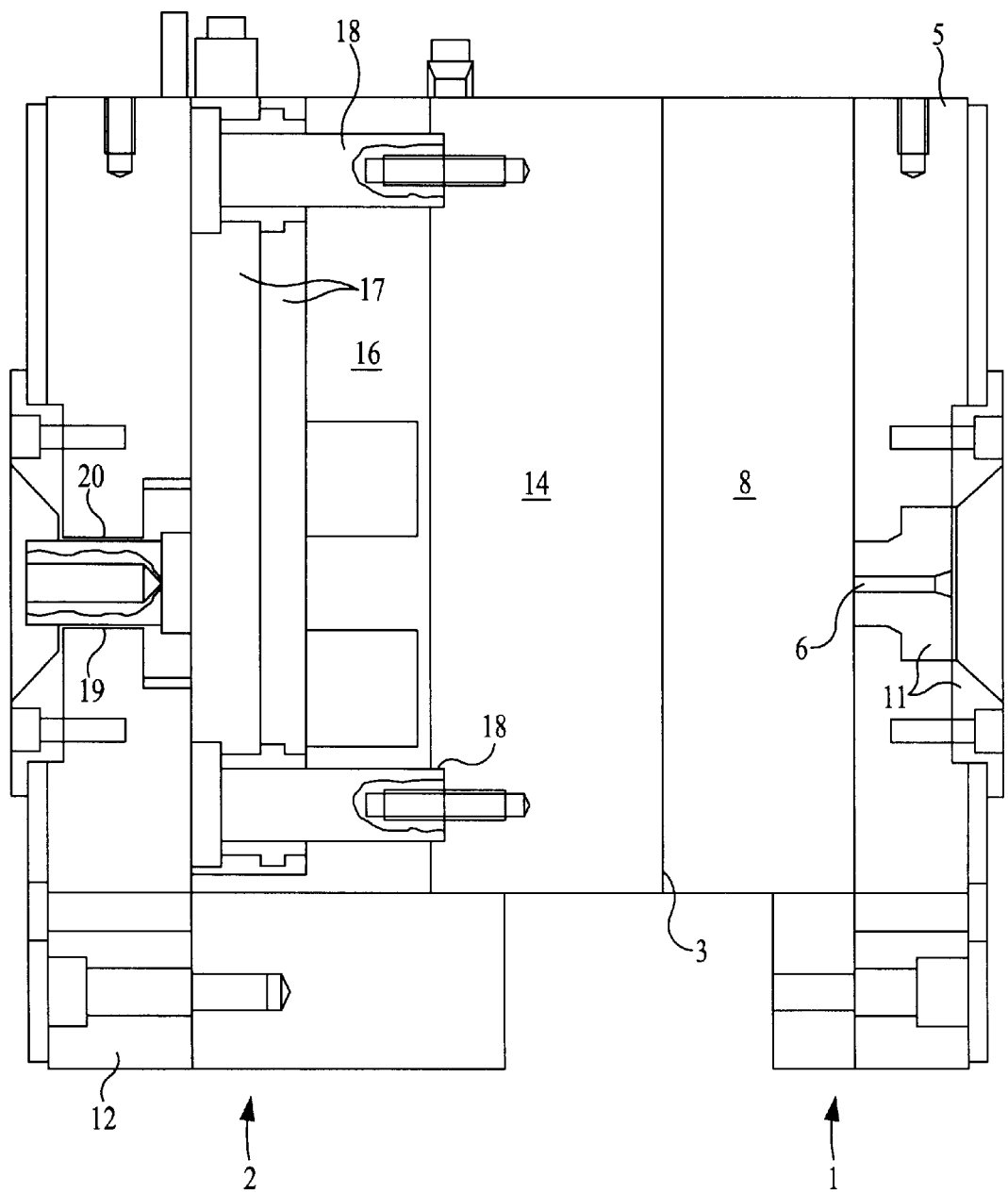
FIG. 2 shows a lateral partial sectional view of the casting device.

A receiving space 16 is present between cassette receptacle 13 and clamping plate 12, with an ejector package 17 being arranged in space 16. Ejector package 17 is held, guided and supported on columns 18, which are mounted on cassette 14 and extend through receiving space 16, as shown in FIG. 2. A push and pressure bar (not shown) serves to displace ejector package 17. The bar extends through an opening 19 in clamping plate 12 and is connected with a claw plate 21 via a screw bush 20. Claw plate 21 has claws 21a, which grip ejector package 17 on its edges from behind. Ejector package 17 is insertable behind claw plate 21 parallel with cassette 14.

Figure 4:
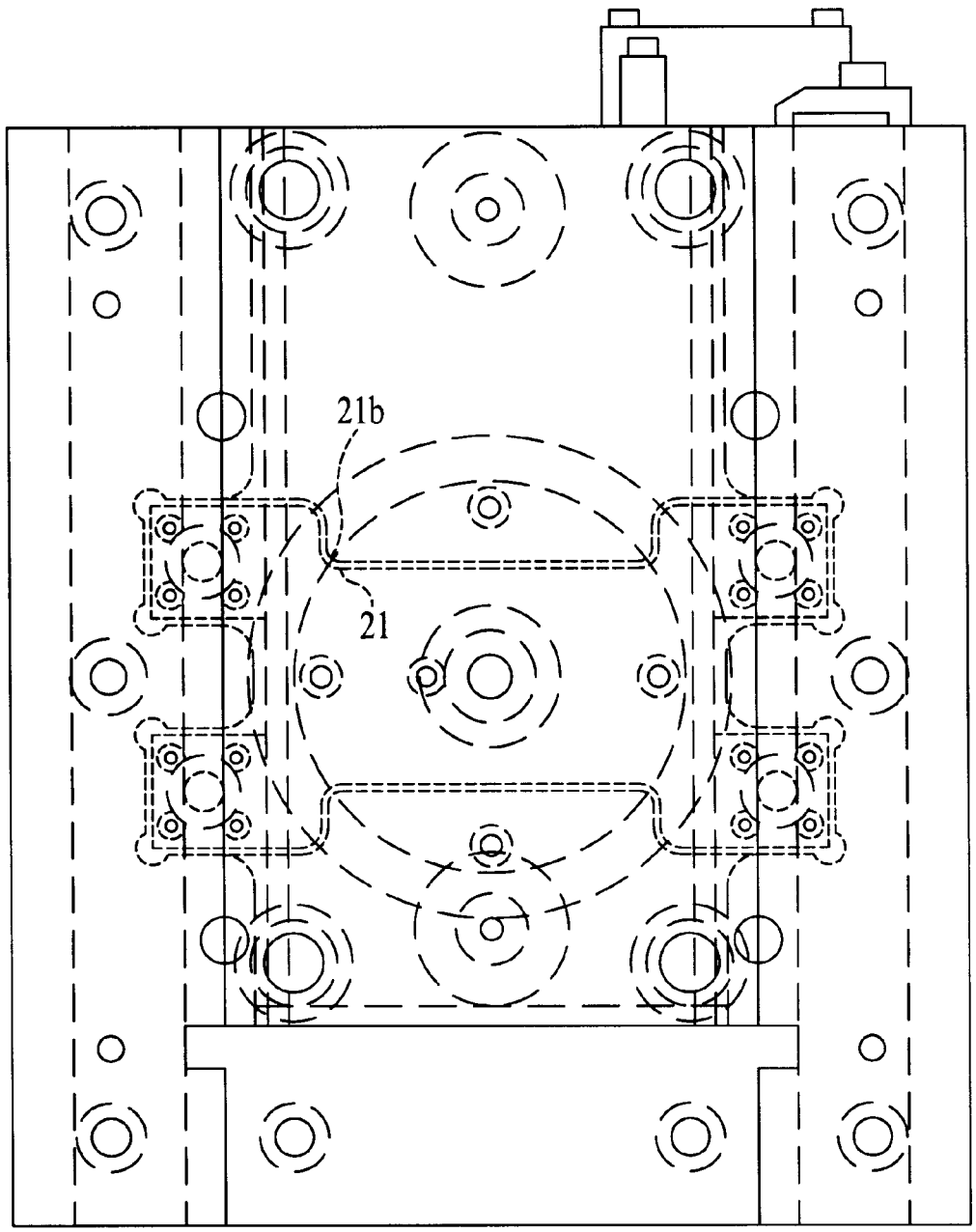
FIG. 4 shows a lateral view of the casting device viewed against the direction of casting.

As shown in FIG. 4, claw plate 21 has wave-like recessed moldings 21b on its sides within the range of columns 18. Claw plate 21 can be sunk in a matching recess of clamping plate 12 in such a way that when the mold is closed, the ejector package 17 is supported over a large area on clamping plate 12 and on claw plate 12 which is sunk into clamping plate 12. Such support over a large area makes it possible to support the forces acting on the cassette 14 and ejector package 17 over a large area when the mold is closed.

Figure 5:
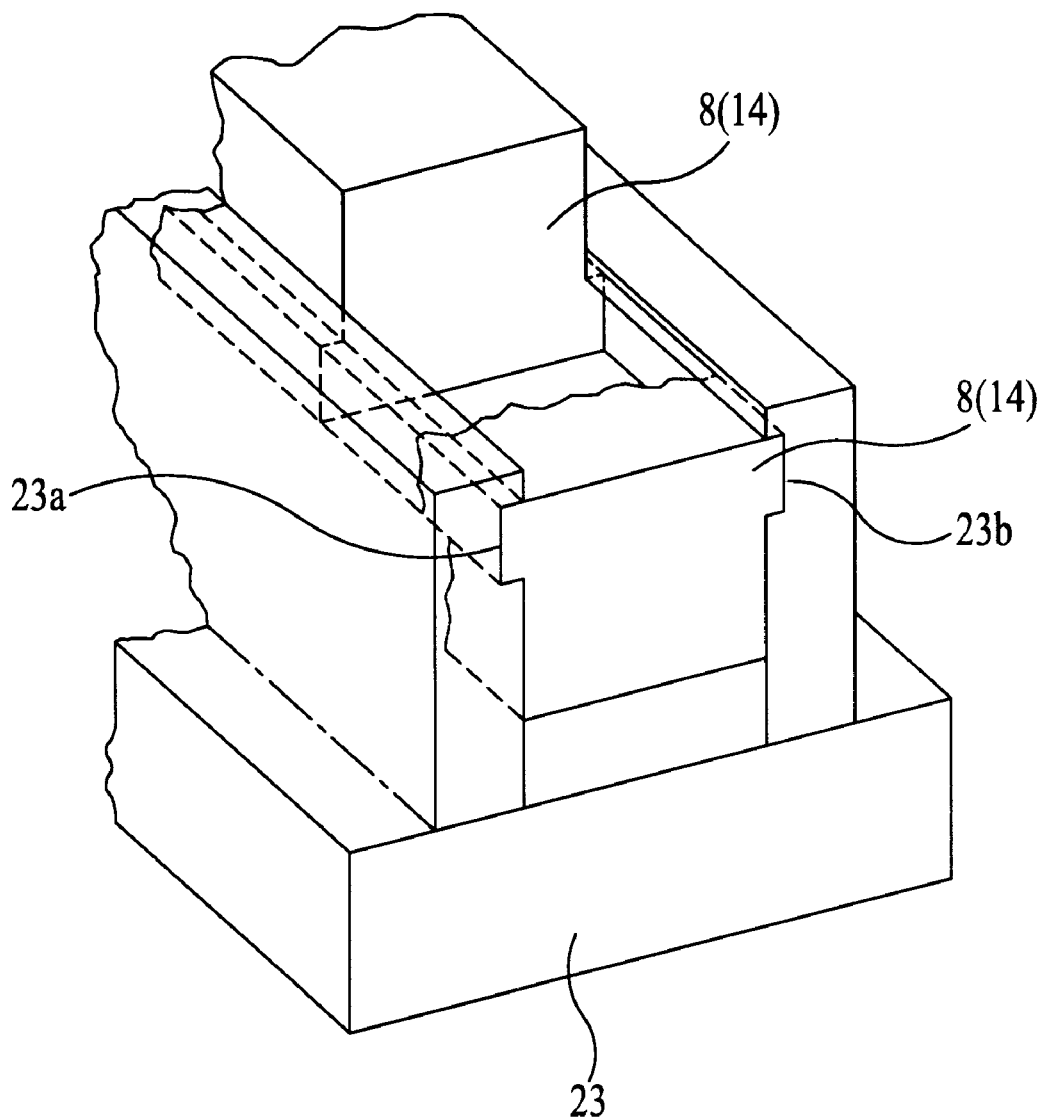
FIG. 5 shows a perspective view of the front side of the cassette receptacle on the machining station.
Figure 6:
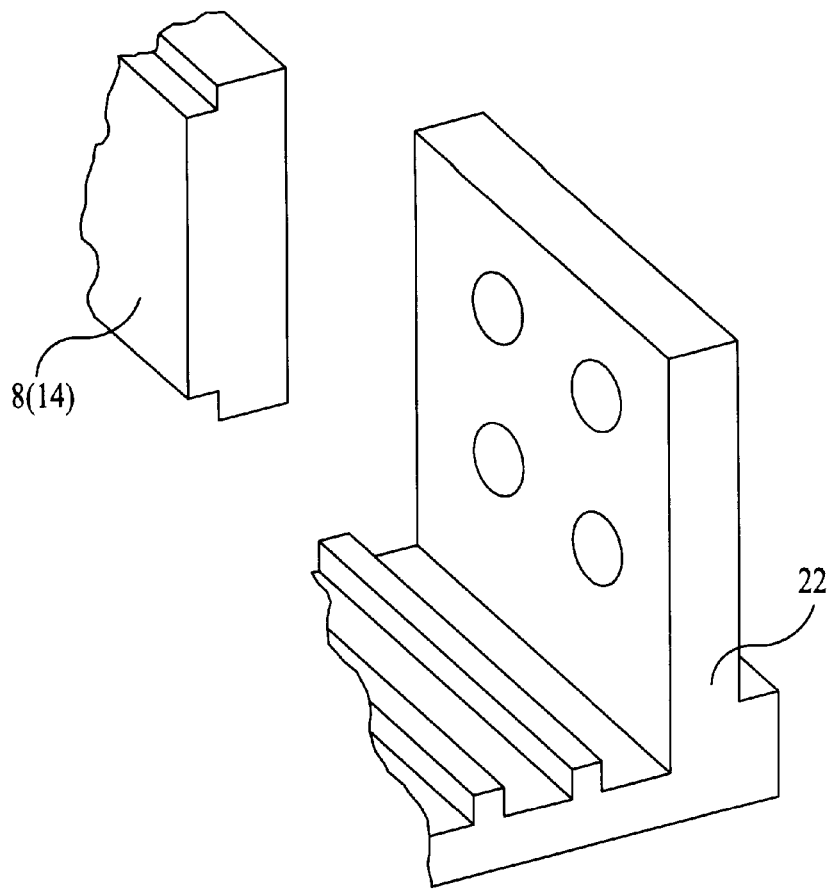
FIG. 6 shows a partial perspective view of one embodiment of an adaptor.
Figure 7:
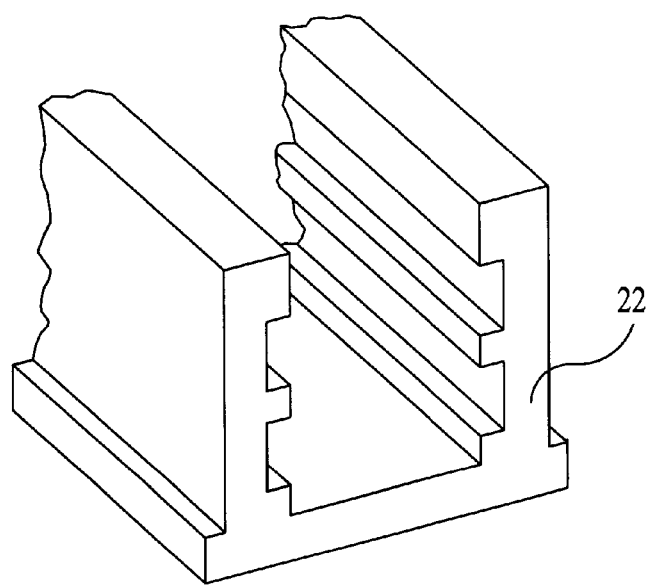
FIG. 7 shows a perspective view of another embodiment of an adaptor.

FIG. 5 shows a perspective view of a clamping device for clamping cassette 8 or 14 on a machining table of a machining station (not shown). FIG. 5 shows that the clamping device has positive guides 23a and 23b which jointly form a cassette receptacle 23. FIG. 5 shows how the cassettes 8 or 14 can be fixed in the clamping device in different positions and turned against each other by 180°. FIGS. 6 and 7 show designs of the adaptors 22, which make it possible to fix and work cassettes 8 or 14 in other positions in the clamping device.

Figure 8:
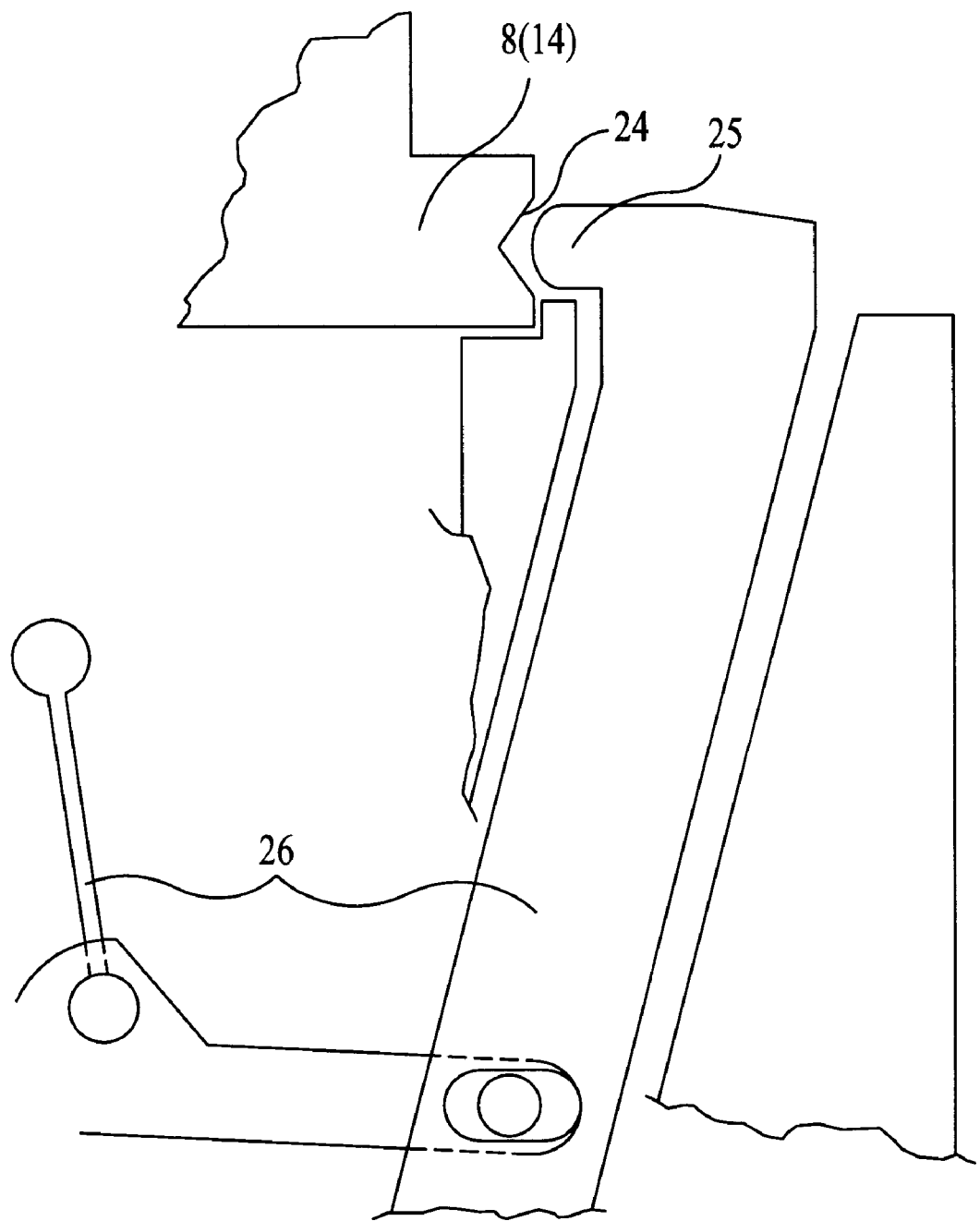
FIG. 8 shows a partial side view of a cassette receptacle adaptor with auxiliary centering and clamping means.

FIG. 8 shows an embodiment of the clamping device that is provided with an additional clamping and centering device. For this purpose, cassette 8 or 14 is provided with V-grooves 24, into which the claws or bars 25 can be pushed from the side. Claws or bars 25 are pressed into the V-grooves 24 of cassettes 8 or 14 uniformly from both sides by a lever system 26, which thus centers the cassette 8 or 14 in the correct machining position.

Figure 9:
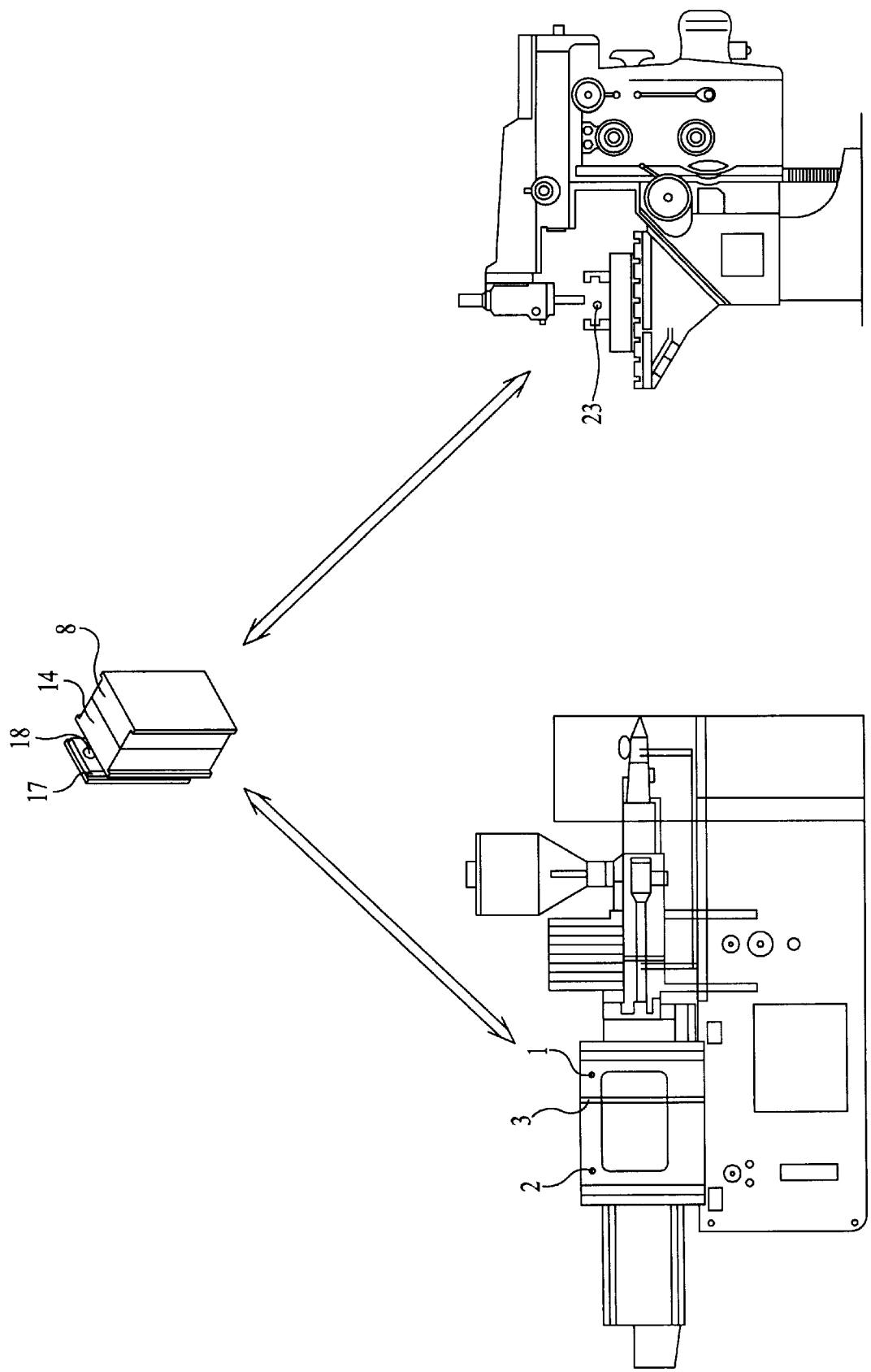
FIG. 9 shows a side view of the system according to the invention.

FIG. 9 shows the system as a whole. The casting machine shown on the left contains two mold halves 1 and 2 which are separated from each other on separation surface 3. Exchangeable cassettes 8 and 14 can be inserted into mold halves 1 and 2. Cassette 14 is connected with ejector package 17 by guide pillars 18 and forms an exchangeable unit with ejector package 17.

The machining station shown on the right is provided with a cassette receiver 23 having forced guides for cassettes 8 and 14. The forced guides of cassettes 8 and 14 are formed in such a manner that they fit exactly and without time-consuming adjustment into the forced guides of cassette receiver 23 on the machining station. The reciprocal exchangeability is symbolized by the arrows in FIG. 9. As a whole, the above-described casting device, machining station and cassette constitute the system according to the invention.

Accordingly, while only a few embodiments of the present invention have been shown and described, it is obvious that many changes and modifications may be made thereunto without departing from the spirit and scope of the invention.

What is claimed is:

1. A system for manufacturing molded articles and simultaneous engineering of mold cavities, comprising:
   a casting device comprising:
   (a) a casting mold having two mold halves moveable against each other perpendicular to a separation surface, said mold halves each having cassette receptacles; and (b) interchangeable cassettes inserted into cassette receptacles of the mold halves, said cassettes abutting each other and enclosing a mold cavity when the casting mold is closed, said cassettes having positive guides on their sides opposite the separation surface, said guides being insertable into the positive guides on the cassette receptacles of the mold halves;

a machining device comprising:
 (a) a machining station selected from the group consisting of a drill, a turning tool, a milling tool, a grinder and an eroding tool; and
 (b) a clamping device within a working range of the machining station, said clamping device having cassette receptacles with positive guides, said positive guides of said cassette receptacles corresponding to the positive guides of the cassettes;

wherein said cassettes can be interchangeably and precisely mounted in the cassette receptacles of the machining device and of the casting device without adjusting the position of the cassettes.

2. The system according to claim 1, further comprising an ejector package associated with one of the cassettes, said ejector package being held, guided and supported on guide columns mounted on a back side of said one cassette, wherein a cassette receptacle that receives said one cassette is provided with a receiving space to receive said ejector package and guide columns when said one cassette is inserted into said cassette receptacle.

3. The system according to claim 2, wherein said casting device further comprises a claw plate having claws and being actuated by a tension and pressure bar, said claw plate gripping said ejector package from behind, said ejector package being insertable behind the claws of said claw plate parallel and together with said one cassette.

4. The system according to claim 3, wherein the mold half receiving the claw plate has a recess for receiving the claw plate such that the claw plate is sunk flush in the recess.

5. The system according to claim 3, wherein the claw plate has recesses on its edge, said recesses being located near said guide columns.

6. The system according to claim 1, further comprising adaptors insertable into the positive guides of the cassette receptacles of the clamping device, said adaptors enabling the cassettes to be mounted in different positions with respect to the machine tool.

* * * * *